US012388175B2

(12) United States Patent
Yu et al.

(10) Patent No.: US 12,388,175 B2
(45) Date of Patent: Aug. 12, 2025

(54) PHASE SHIFTER WITH ADJUSTABLE OUTPUT MODE AND ANTENNA

(71) Applicants: Jiangsu Hengxin Technology Co., Ltd., Jiangsu (CN); Jiangsu Hengxin Wireless Technology Co., Ltd., Jiangsu (CN)

(72) Inventors: Xiaochao Yu, Jiangsu (CN); Haiyan Song, Jiangsu (CN); Yanping Hua, Jiangsu (CN); Junfeng Shao, Jiangsu (CN); Xianyu Xie, Jiangsu (CN); Jie Liu, Jiangsu (CN)

(73) Assignees: Jiangsu Hengxin Technology Co., Ltd., Jiangsu (CN); Jiangsu Hengxin Wireless Technology Co., Ltd., Jiangsu (CN)

( * ) Notice: Subject to any disclaimer, the term of this patent is extended or adjusted under 35 U.S.C. 154(b) by 0 days.

(21) Appl. No.: 18/020,556

(22) PCT Filed: Aug. 31, 2022

(86) PCT No.: PCT/CN2022/116099
§ 371 (c)(1),
(2) Date: Feb. 9, 2023

(87) PCT Pub. No.: WO2023/077933
PCT Pub. Date: May 11, 2023

(65) Prior Publication Data

US 2024/0275042 A1 Aug. 15, 2024

(30) Foreign Application Priority Data

Nov. 2, 2021 (CN) ........................ 202111290242.5

(51) Int. Cl.
*H01Q 3/32* (2006.01)
*H01P 1/18* (2006.01)

(52) U.S. Cl.
CPC ................ *H01Q 3/32* (2013.01); *H01P 1/18* (2013.01); *H01P 1/184* (2013.01)

(58) Field of Classification Search
CPC .... H01P 1/184; H01P 1/18; H01P 1/20; H01P 1/2039; H01Q 1/24; H01Q 3/32;
(Continued)

(56) References Cited

U.S. PATENT DOCUMENTS

2015/0116180 A1* 4/2015 Wu ........................ H01P 1/184
333/139
2021/0135328 A1* 5/2021 Kang ...................... H01P 1/184

* cited by examiner

*Primary Examiner* — Lincoln D Donovan
*Assistant Examiner* — Tyler J Pereny
(74) *Attorney, Agent, or Firm* — Jose Cherson Weissbrot

(57) ABSTRACT

The present disclosure provides a phase shifter with an adjustable output mode, capable of switching the output mode of a conventional antenna in a vertical plane, includes a fixed dielectric plate provided with a fixed circuit; a moving sliding plate, the moving sliding plate is provided on the side of the fixed dielectric plate, a plurality of sliding circuits are provided on the moving sliding plate corresponding to each of the fixed circuits, the fixed circuits are capable of being coupled with at least one of the corresponding sliding circuits to form a phase-shifting circuit together, and the moving sliding plate slides with respect to the fixed dielectric plate, is capable of switching the sliding circuits coupled with the fixed circuits, and is capable of adjusting the phase of the output signal of the phase-shifting circuit; the present disclosure further provides an antenna using the phase shifter.

14 Claims, 5 Drawing Sheets

(58) Field of Classification Search
CPC ...... H01Q 21/24; H01Q 25/00; H01Q 25/001; H01Q 3/40; H01Q 21/061; H01Q 3/30
See application file for complete search history.

PHASE SHIFTER WITH ADJUSTABLE OUTPUT MODE AND ANTENNA

TECHNICAL FIELD

The present disclosure relates to the technical field of mobile communication antennas, in particular to a phase shifter with an adjustable output mode and an antenna.

BACKGROUND

As an important part of a wireless communication system, a base station antenna plays an important role in transmitting and receiving wireless communication signals, and the performance thereof is directly related to the communication quality of the whole communication system. With the rapid development of the mobile communication technology, the mainstream technologies such as multi-band and large-scale arrays have been gradually applied to an electrically tunable base station antenna. For some special conditions, application requirements for antennas are more complex, such as antennas for high-rise building coverage, blind supplement of base station signals, etc. Under those conditions, it is necessary for electrically tunable antennas to switch to a wide beam operating mode to meet the coverage requirements of special scenes.

Vertical plane beam width of a conventional antenna is fixed, therefore cannot meet the requirements of beam switching. In view of this, it is necessary to provide a new phase shifter with the function of an adjustable output mode.

SUMMARY

In view of the above problems, the present disclosure provides a phase shifter with an adjustable output mode, which can achieve the function of switching the output mode of a conventional antenna in a vertical plane. In addition, the present disclosure further provides an antenna using the phase shifter with an adjustable output mode.

The technical solution is as follows. A phase shifter with an adjustable output mode, comprising:

a fixed dielectric plate, wherein a fixed circuit is provided on the fixed dielectric plate;

a moving sliding plate, wherein the moving sliding plate is provided on the side of the fixed dielectric plate provided with fixed circuits, a plurality of sliding circuits are provided on the moving sliding plate corresponding to each of the fixed circuits, the fixed circuits are capable of being coupled with at least one of the corresponding sliding circuits to form a phase-shifting circuit together, and the moving sliding plate slides with respect to the fixed dielectric plate, is capable of switching the sliding circuits coupled with the fixed circuits, and is capable of adjusting the phase of the output signal of the phase-shifting circuit.

Further, the phase shifter with an adjustable output mode further comprises a sliding limiting mechanism, wherein the sliding limiting mechanism comprises a slider buckle, the moving sliding plate is provided with an escape groove, the slider buckle passes through the escape groove and is mounted with the fixed dielectric plate, and the slider buckle is provided and press-mounted on the moving sliding plate, so that when the fixed circuit and the sliding circuit are coupled, the coupling joint of the fixed circuit and the sliding circuit keeps in contact.

Further the slider buckle is provided with a snap hook, the fixed dielectric plate is correspondingly provided with a slider buckle mounting hole, the snap hook passes through the escape groove and cooperates with the slider buckle mounting hole, the slider buckle and the fixed dielectric plate are mounted together, the slider buckle is further provided with a pressing plate, and the pressing plate is press-mounted on the moving sliding plate, so that the coupling joint of the fixed circuit and the sliding circuit keeps in contact.

Further, the slider buckle is further provided with a positioning column, the fixed dielectric plate is provided with a slider buckle positioning hole corresponding to the positioning column, and the positioning column cooperates with the slider buckle positioning hole to position the slider buckle.

Further, the phase shifter with an adjustable output mode further comprises a transmission member, wherein the transmission member is connected with the moving sliding plate, and the moving sliding plate drives the moving sliding plate to move through the transmission member.

Further, the transmission member comprises a transmission column, the moving sliding plate is provided with a transmission hole corresponding to the transmission column, the transmission member is connected with the moving sliding plate through the cooperation of the transmission column and the transmission hole, the fixed dielectric plate is correspondingly provided with a guide groove, and the transmission column passes through the transmission hole and extends into the guide groove.

Further, the fixed circuit comprises an input line, a first output line, a power division line and a second output line which are provided in an open circuit with each other, the power division line comprises a power division input branch, a first power division output branch and a second power division output branch which are connected, the sliding circuit comprises a single-port coupling line which couples the input line and the first output line, a power division input coupling line which couples the input line and the power division input branch, a first output coupling line which couples the first output line and the first power division output branch, and a second output coupling line which couples the second output line and the second power division output branch.

Further, the input line is parallel to the open end of the first output line at intervals, the power division input branch is parallel to the moving direction of the moving sliding plate, the power division input branch is parallel to the first power division output branch at intervals, and the open end of the second power division output branch is parallel to the second output line at intervals.

Further, when two or more fixed circuits are provided on the fixed dielectric plate, an isolation line is provided between two adjacent second output lines.

Further, the power division input branch is provided with an input impedance conversion line, the first power division output branch is provided with a first impedance conversion line, the second power division output branch is provided with a second impedance conversion line, and the line widths and the line lengths of the power division input branch, the first power division output branch, the second power division output branch, the input impedance conversion line, the first impedance conversion line, the second impedance conversion line, and the second output line are adjustable.

Further, the shapes, the line widths and the line lengths of the single-port coupling line, the first output coupling line, the second output coupling line and the power division input coupling line are adjustable.

Further, the fixed circuit is arranged on the fixed dielectric plate by a PCB etching process, and the sliding circuit is arranged on the moving sliding plate by the PCB etching process.

Further, the side of the moving sliding plate provided with the sliding circuit is covered with a PTFE film to avoid the sliding circuit.

Further, when the input line is coupled with the first output line through the sliding circuit, the phase shifter is in a single-port output operating mode; when the input line is coupled with the first output line and the second output line through a sliding circuit simultaneously, the phase shifter is in a double-port output operating mode, the phase of the output signal of the first output line remains unchanged, and the phase of the output signal of the second output line changes with the movement of the moving sliding plate.

An antenna, wherein the phase shifter with an adjustable output mode is used, when the phase shifter is in a single-port output operating mode, the antenna is in a wide beam operating mode in a vertical plane, and when the phase shifter is in a double-port output operating mode, the antenna is in a narrow beam operating mode in a vertical plane, the phase of the output signal of the second output line changes with the movement of the moving sliding plate, and the direction of the antenna is capable of being adjusted with the movement of the moving sliding plate.

The phase shifter with an adjustable output mode according to the present disclosure has a single-port output mode and a double-port output mode, and can switch between the two modes, wherein the double-port output mode is provided with a phase shifting function. The vertical plane of the antenna using the phase shifter has a wide beam operating mode and a narrow beam operating mode with an adjustable direction. The phase shifter not only can realize the switching function between the wide beam and the narrow beam of the conventional antenna in the vertical plane, but also meet the layout requirements of the current large-scale array antenna.

Figure 1:
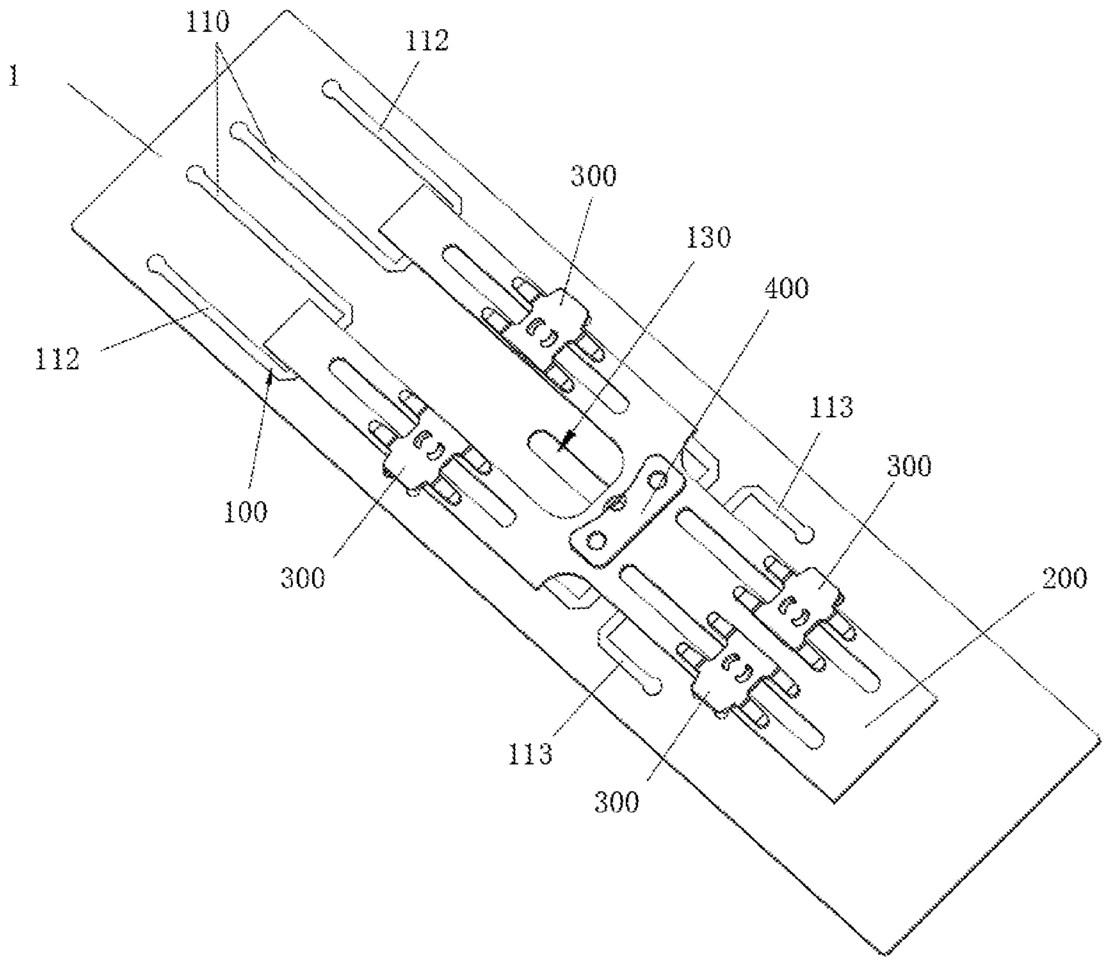
FIG. 1 is a schematic diagram of the overall structure of a phase shifter with an adjustable output mode according to an embodiment of the present disclosure.

Description of reference numbers: 1. Fixed dielectric plate; 100. Fixed circuit; 110. Input line; 111. Power division line; 112. First output line; 113. Second output line; 120. Metal reference ground; 130. Guide groove; 140. Slider buckle mounting hole; 141. Slider buckle positioning hole; 150. Input terminal; 151. First output terminal; 152. Second output terminal; 160. Power division input branch; 161. First power division output branch; 162. Second power division output branch; 170. Input impedance conversion line; 171. First impedance conversion line; 172. Second impedance conversion line; 180. Isolation line;

2. Moving sliding plate; 200. Moving dielectric plate; 210. Power division input coupling line; 211. First output coupling line; 212. Second output coupling line; 213. Single-port coupling line; 220. Escape groove; 230. Transmission hole; 240. PTFE film; 300. Slider buckle; 310. Positioning column; 320. Snap hook; 330. Pressing plate; 400. Transmission member; 410. Transmission column.

DETAILED DESCRIPTION

The technical solution of the utility model will be described clearly and completely in conjunction with the attached drawings hereinafter. It should be noted that the drawings provided in this embodiment only explain the basic concept of the present utility model by way of illustration, so that only the components related to the present utility model are shown in the drawings instead of being drawn according to the number, shape and size of the components in actual implementation. The shape, number and proportion of each component in actual implementation can be arbitrarily changed, and the layout shape of the components may be more complicated.

As shown in FIGS. 1-8, this embodiment provides a phase shifter with an adjustable output mode, which is suitable for a single-row dual-polarization antenna, comprising:

a fixed dielectric plate 1, wherein a fixed circuit 100 is provided on the fixed dielectric plate 1. In the embodiment shown in FIG. 3, there are two fixed circuits 100. Each fixed circuit 100 comprises an input line 110, a first output line 112, a power division line 111, and a second output line 113 which are provided in an open circuit with each other. The power division line 111 comprises a power division input branch 160, a first power division output branch 161, and a second power division output branch 162 which are connected. The second output line 113 corresponds to the second power division output branch 162, and the first output line 112 corresponds to the first power division output branch 161.

Figure 3:
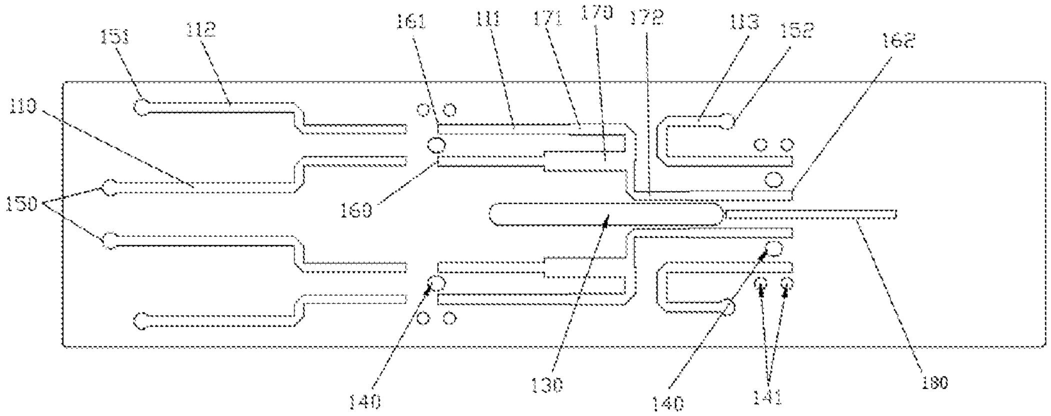
FIG. 3 is a schematic diagram of the layout of a fixed circuit on a fixed dielectric plate according to an embodiment.

In the embodiment shown in FIG. 3, the power division line 111 is equivalent to a power divider divided into two parts. One end of the input line 110 is the input terminal 150, and the other end thereof is provided in an open circuit. One end of the first output line 112 is the first output terminal 151, and the other end thereof is provided in an open circuit. The input and output terminals of the branch line 111 are all provided in an open circuit. One end of the second output line 113 is the second output terminal 152, and the other end thereof is provided in an open circuit.

In the embodiment shown in FIG. 3, the input line 110 is parallel to the open end of the first output line 112 at intervals. The power division input branch 160 is parallel to the first power division output branch 161 at intervals. The open end of the second output line 113 is parallel to the second power division output branch 162 at intervals. The distance between three parallel lines can be adjusted according to the actual layout.

In addition, in this embodiment, the power division line 111 is further provided with an input impedance conversion line 170, a first impedance conversion line 171 and a second impedance conversion line 172.

The phase shifter further comprises a moving sliding plate 2. The moving sliding plate 2 is provided on the side of the fixed dielectric plate 1 provided with fixed circuits 100. A plurality of sliding circuits 200 are provided on the moving sliding plate 2 corresponding to each of the fixed circuits 100. The fixed circuits 100 are capable of being coupled with at least one of the corresponding sliding circuits 200 to form a phase-shifting circuit together. The moving sliding plate 2 slides with respect to the fixed dielectric plate 1, is capable of switching the sliding circuits 200 coupled with the fixed circuits 100, and is capable of adjusting the phase of the output signal of the phase-shifting circuit.

Figure 4:
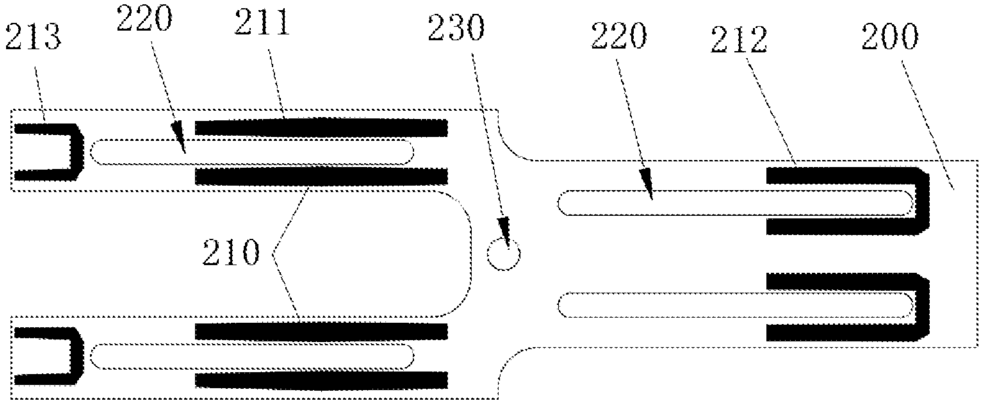
FIG. 4 is a schematic diagram of the layout of a sliding circuit on a moving sliding plate according to an embodiment.

In this embodiment, as shown in FIG. 4, the sliding circuit 200 comprises a power division input coupling line 210 that couples the input line 110 and the power division input branch 160, a first output coupling line 211 that couples the first output line 112 and the first power division output branch 161, a second output coupling line 212 that couples the second output line 113 and the second power division output branch 162, and a single-port coupling line 213 that couples the input line 110 and the first output line 112.

In this embodiment, as shown in FIG. 4, the power division input coupling line 210 and the first output coupling line 211 are both linear, and the second output coupling line 212 and the single-port coupling line 213 are both U-shaped.

Figure 5:
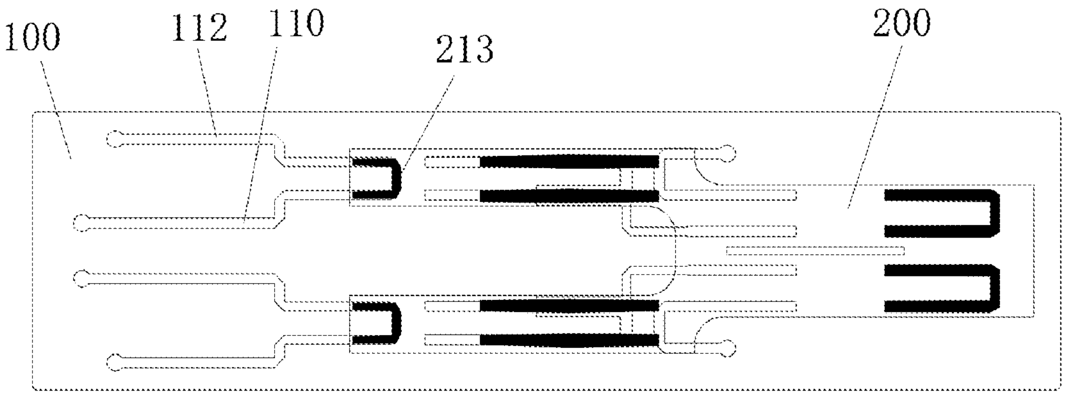
FIG. 5 is a schematic diagram of the line position of a phase shifter in a single-port output mode according to an embodiment.

In this embodiment, as shown in FIG. 5, in the single-port output operating mode, the moving sliding plate 2 is no longer relative to the fixed dielectric plate 1. At this time, the single-port coupling line 213 can be coupled with the input line 110 and the first output line 112. The input line 110 and the first output line 112 are switched from an open state to an on-state. After the signal is input from the input terminal 150 of the input line, the signal can only be output through the first output terminal 151, thus realizing the single-port output operating mode. Furthermore, the antenna using the phase shifter in this state can realize a wide beam operating mode.

Figure 6:
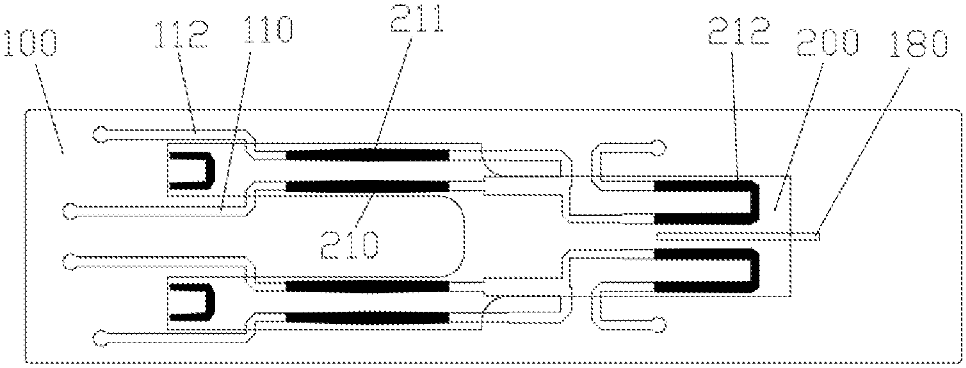
FIG. 6 is a schematic diagram of the line position of a phase shifter in a double-port output mode according to embodiment 1.
Figure 7:
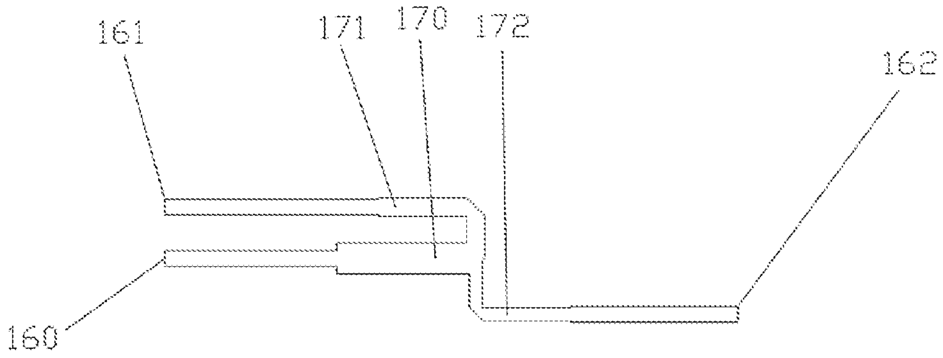
FIG. 7 is a schematic diagram of the arrangement of a power division line according to an embodiment.
Figure 8:
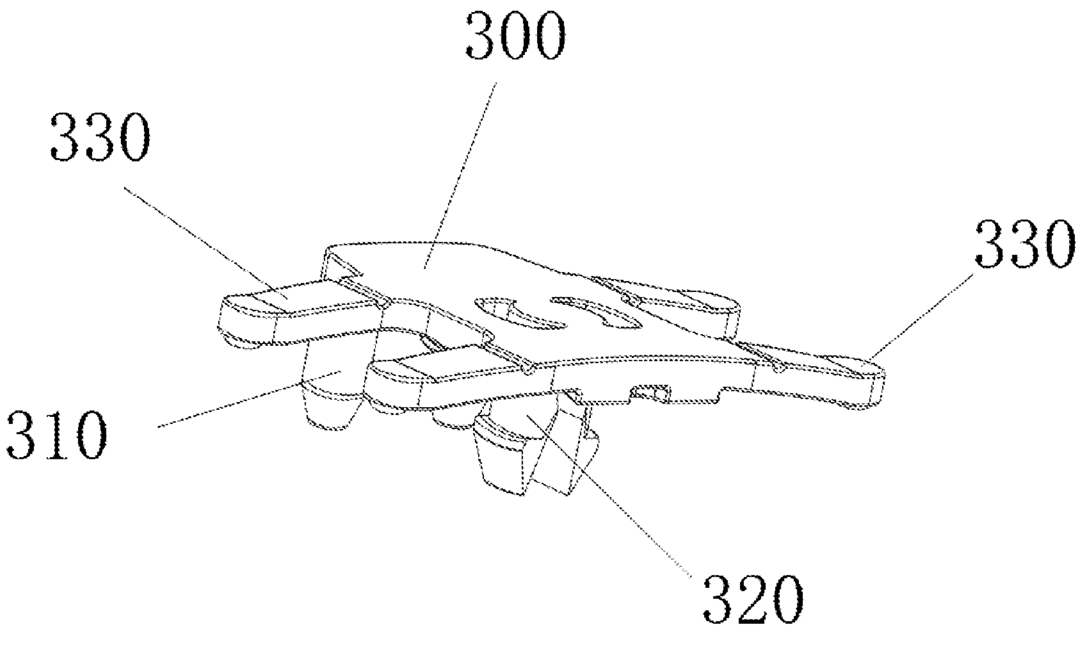
FIG. 8 is a structural schematic diagram of a slider buckle according to an embodiment.

In this embodiment, as shown in FIG. 6, in the double-port output mode, the moving sliding plate 2 can move with respect to the fixed dielectric plate 1. The power division input coupling line 210 is coupled with the input line 110 and the power division input branch 160. The first output coupling line 211 can be coupled with the first output line 112 and the first power division output branch 161. The second output coupling line 212 can be coupled with the second output line 113 and the second power division output branch 162. The input line 110, the power division line 111, the first output line 112 and the second output line 113 are all switched from the open state to the on-state. At this time, the single-port coupling line 213 is out of the coupling area of the correlated lines of the fixed circuit and belongs to the idle state. After the signal is input from the input terminal 150, the signal is divided into two parts by a power divider after passing through the power division input coupling line 210. One signal is output from the first output terminal 151 through the first output coupling line 211, and the other signal is output by the second output terminal 152 after passing through the second output coupling line 212, thus realizing the dual-port output mode. At the same time, during the movement of the moving sliding plate 2, the phase of the corresponding output of the second output terminal 152 also changes, and then the antenna of the phase shifter at this time is uses, so as to realize the narrow beam operating mode with an adjustable direction. The position of the moving sliding plate 2 shown in FIG. 6 is only a schematic illustration. In fact, the moving sliding plate 2 can move within a certain range from the left to the right at this position, so as to realize the phase adjustment of the output of the second output terminal 152 in the double-port output mode.

In addition, as shown in FIG. 6, in this embodiment, in the double-port output mode, the distance between the two second power division output branches 162 is small, and an isolation line 180 is specially provided to reduce the coupling between the two second power division output branches 162 and improve the isolation between channels.

Figure 2:
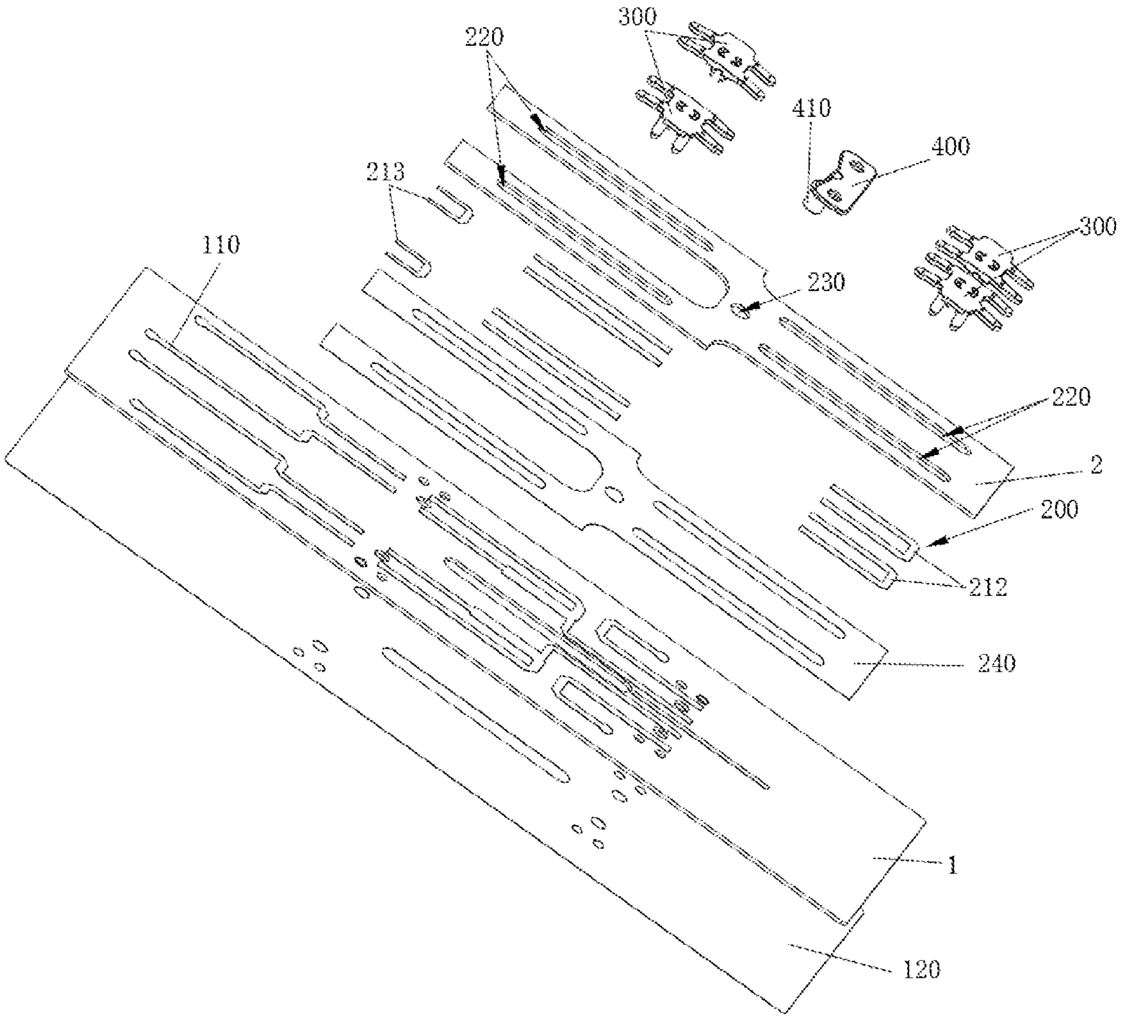
FIG. 2 is an explosive diagram of the overall structure of a phase shifter according to an embodiment.

As shown in FIG. 2, in one embodiment of the present disclosure, a layer of PTFE film 240 is coated on the side of the moving sliding plate 2 provided with the sliding circuit 200, so as to reduce the friction force generated by the moving sliding plate 2 in the moving process and avoid the wear of the sliding circuit on the moving sliding plate 2 in the moving process.

As shown in FIG. 1 and FIG. 2, in one embodiment of the present disclosure, the positional relationship of the dielectric layers and circuit layers of the fixed dielectric plate 1 and the moving sliding plate 2 is as follows from top to bottom: the moving sliding plate 2→the power division input coupling line 210, the first output coupling line 211, the second output coupling line 212, the single-port coupling line 213→the input line 110, the power division line 111, the first output line 112, the phase shift output line 113, the isolation line 180→the fixed dielectric plate 1→the metal reference ground 120.

In the embodiment of the present disclosure, the parameters such as the shapes, line lengths and line widths of the single-port coupling line 213 are adjusted, so as to provide better impedance matching for the single-port output mode.

The line widths and the line lengths of the input impedance conversion line 170, the first impedance conversion line 171 and the second impedance conversion line 172 on the power division line 111 are adjusted, which not only can optimize the impedance matching in the double-port output mode, but also adjust the output power of the first output terminal 151 and the second output terminal 152. The shapes, the line widths, the line lengths and other parameters of the input coupling line 210, the first output coupling line 211 and the second output coupling line 212 are adjusted, which can also effectively optimize the impedance matching in the double-port output mode. In addition, the lines near the power division input branch 160, the first power division output branch 161 and the second power division output branch 162 and the phase shift output line 113 are adjusted, which can also optimize the impedance matching.

The embodiment shown in FIG. 1, FIG. 2, FIG. 3, and FIG. 4 further comprises a sliding limiting mechanism. The sliding limiting mechanism comprises a slider buckle 300. The moving sliding plate 2 is located between the fixed dielectric plate 1 and the slider buckle 300. The moving sliding plate 2 is provided with an escape groove 220. The slider buckle 300 passes through the escape groove 220 and is mounted with the fixed dielectric plate 1. The slider buckle 300 is provided and press-mounted on the moving sliding plate 2, so that when the fixed circuit 100 and the sliding circuit 200 are coupled, the coupling joint of the fixed circuit 100 and the sliding circuit 200 keeps in contact.

Specifically, the slider buckle 300 is provided with a snap hook 320. The fixed dielectric plate is correspondingly provided with a slider buckle mounting hole 140. The snap hook 320 on the slider buckle 300 passes through the escape groove 220 on the moving sliding plate and the slider buckle mounting hole 140 on the fixed circuit, and hooks the fixed dielectric plate 1. The slider buckle 300 is further provided with a pressing plate 330. The pressing plate 330 is press-mounted on the moving sliding plate 2, so that the coupling joint of the fixed circuit 100 and the sliding circuit 200 keeps in contact. It is ensured that the friction force of the moving sliding plate when moving with respect to the fixed circuit is within a reasonable range while ensuring that the moving sliding plate is attached to the fixed circuit, preventing that the moving sliding plate cannot move due to excessive friction force.

The slider buckle 300 is further provided with a positioning column 310. The fixed dielectric plate 1 is provided with a slider buckle positioning hole 141 corresponding to the positioning column 310. The positioning column 310 cooperates with the slider buckle positioning hole 141 to position the slider buckle 141, so as to prevent the slider buckle from rotating. At the same time, the positioning column 310 can also avoid the deviation of the moving sliding plate in the vertical direction of the moving track, and prevent the impedance mismatch caused by the deviation of the moving sliding plate. In other embodiments of the present disclosure, the positioning column 310 can be replaced by a plurality of snap hooks.

In the embodiment of the present disclosure, the phase shifter further comprises a transmission member 400. The transmission member 400 is connected with the moving sliding plate 2, and the moving sliding plate 2 drives the moving sliding plate 2 to move through the transmission member 400.

The transmission member 400 comprises a transmission column 410. The moving sliding plate 2 is provided with a transmission hole 230 corresponding to the transmission column. The transmission member 400 is connected with the moving sliding plate 2 through the cooperation of the transmission column 410 and the transmission hole 230. The fixed dielectric plate 1 is correspondingly provided with a guide groove 130. The guide groove 130 is formed along the moving direction of the moving sliding plate. The transmission column 410 passes through the transmission hole 230 and extends into the guide groove 130.

The external force pulls the transmission member 400 to move the transmission column 410. The transmission column 410 passes through the transmission hole 230 on the moving sliding plate and moves in the guide groove 130, so as to control the moving sliding plate to move accurately. The escape groove 220 on the moving sliding plate is formed along the moving direction of the moving sliding plate 2, so as to prevent the moving sliding plate from interfering with the snap hook 320 on the slider buckle 300 in the moving process, prevent the slider buckle 300 from loosening, and avoid the problems of impedance mismatch resulted from the loosening of the sliding plate due to the loosening of the slider buckle 300.

In the embodiment of the present disclosure, the slider buckle is processed by injection molding of high-temperature resistant insulating material, and has the functions of limiting the moving sliding plate and making the moving sliding plate attached to the fixed circuit. The transmission member is processed by injection molding of high-temperature resistant insulating material, and has the function of driving the moving sliding plate to move.

The phase shifter with an adjustable output mode of this embodiment is simple in structure, flexible in layout and smaller in overall size, which meets the compact layout requirements of large-scale array antennas. The phase shifter can realize two output modes: single-port output or double-port output, in which the double-port output mode also has a phase shifting function. The moving sliding plate is adjusted to realize two output modes, and then realize a wide beam radiation mode and a narrow beam radiation mode through antenna vibrator radiation. The phase shifter uses a conventional PCB etching process, and is simple in structure, conducive to mounting and wiring, low in manufacturing cost, and suitable for mass production.

In addition, compared with the existing technical solution, the present disclosure has the following advantages.

1. The layout is flexible. The proper layout of the single-port coupling line and the second output coupling line can be selected according to the actual application, which can effectively avoid the layout problem caused by the specific line length.

2. The matching difficulty is low. By adjusting the shape, the line width and other parameters of each coupling line, the standing waves at the input ports of single-port output and double-port output can be effectively adjusted, thus reducing the difficulty of debugging the standing waves of the whole machine.

3. The loss is low. Because both the fixed circuit and the sliding circuit uses the straight-through coupling transmission line principle when being coupled, the line loss is lower than that of the conventional implementation mode with open branches.

In an embodiment of the present disclosure, an antenna is further provided. The phase shifter with an adjustable output mode is used. When the phase shifter is in a single-port output operating mode, the antenna is in a wide beam operating mode in a vertical plane. When the phase shifter is in a double-port output operating mode, the antenna is in a narrow beam operating mode in a vertical plane. The phase of the output signal of the second output line changes with the movement of the moving sliding plate. The direction of the antenna is capable of being adjusted with the movement of the moving sliding plate.

The above embodiment is only one embodiment of the present disclosure, but it is not limited by the above embodiment. Any other changes, modifications, substitutions, combinations and simplifications made without departing from the spirit and principle of the present disclosure should be equivalent replacement methods, which are all included in the scope of protection of the present disclosure.

For those skilled in the art, it is obvious that the present utility model is not limited to the details of the above exemplary embodiments, and can be realized in other specific forms without deviating from the spirit or basic features of the present utility model. Therefore, from any point of view, the embodiments should be regarded as exemplary and non-restrictive. The scope of the present utility model is defined by the attached claims instead of the above description, so that it is intended to include all changes that fall within the meaning and scope of the equivalent elements of the claims in the present utility model.

In addition, it should be understood that although this specification is described in terms of embodiments, not every embodiment only contains an independent technical solution. This description of the specification is only for the sake of clarity. Those skilled in the art should take the specification as a whole, and the technical solutions in each embodiment can also be appropriately combined to form other embodiments that can be understood by those skilled in the art.

What is claimed is:

1. A phase shifter with an adjustable output mode, comprising:

a fixed dielectric plate, wherein a fixed circuit is provided on the fixed dielectric plate;

a moving sliding plate, wherein the moving sliding plate is provided on a side of the fixed dielectric plate provided with the fixed circuit, wherein a plurality of sliding circuits are provided on the moving sliding plate corresponding to each fixed circuit, wherein the fixed circuit is capable of being coupled with at least one of the sliding circuits to form a phase-shifting circuit, and wherein the moving sliding plate slides with respect to the fixed dielectric plate, is capable of switching the sliding circuits coupled with the fixed circuit and is capable of adjusting phase of an output signal of the phase-shifting circuit;

wherein the fixed circuit comprises an input line, a first output line, a power division line and a second output line, wherein the input line, the first output line, the power division line and the second output line are provided in an open circuit, wherein the power division line comprises a power division input branch, a first power division output branch and a second power division output branch which are connected with each other;

wherein the plurality of sliding circuits comprise a single-port coupling line which couples the input line and the first output line, a power division input coupling line which couples the input line and the power division input branch, a first output coupling line which couples the first output line and the first power division output branch, and a second output coupling line which couples the second output line and the second power division output branch.

2. The phase shifter with an adjustable output mode according to claim 1, further comprising a sliding limiting mechanism, wherein the sliding limiting mechanism comprises a slider buckle, wherein the moving sliding plate is provided with an escape groove, wherein the slider buckle passes through the escape groove and is mounted with the fixed dielectric plate, and wherein the slider buckle is press-mounted on the moving sliding plate, wherein when the fixed circuit and the sliding circuit are coupled, a coupling joint keeps the fixed circuit and the sliding circuit in contact.

3. The phase shifter with an adjustable output mode according to claim 2, wherein the slider buckle is provided with a snap hook, wherein the fixed dielectric plate is correspondingly provided with a slider buckle mounting hole, wherein the snap hook passes through the escape groove and is coupled with the slider buckle mounting hole, wherein the slider buckle is mounted to the fixed dielectric plate, wherein the slider buckle is provided with a pressing plate, and wherein the pressing plate is press-mounted on the moving sliding plate, wherein the coupling joint keeps the fixed circuit and the sliding circuit in contact.

4. The phase shifter with an adjustable output mode according to claim 2, wherein the slider buckle is provided with a positioning column, wherein the fixed dielectric plate is provided with a slider buckle positioning hole corresponding to the positioning column, and wherein the positioning column is coupled with the slider buckle positioning hole to position the slider buckle.

5. The phase shifter with an adjustable output mode according to claim 1, further comprising a transmission member, wherein the transmission member is connected with the moving sliding plate, and wherein the moving sliding plate drives the moving sliding plate to move through the transmission member.

6. The phase shifter with an adjustable output mode according to claim 5, wherein the transmission member comprises a transmission column, wherein the moving sliding plate is provided with a transmission hole corresponding to the transmission column, wherein the transmission member is connected with the moving sliding plate through the cooperation of the transmission column and the transmission hole, wherein the fixed dielectric plate is correspondingly provided with a guide groove, and wherein the transmission column passes through the transmission hole and extends into the guide groove.

7. The phase shifter with an adjustable output mode according to claim 1, wherein the input line is parallel to an open end of the first output line at intervals, wherein the power division input branch is parallel to a moving direction of the moving sliding plate, wherein the power division input branch is parallel to the first power division output branch at intervals, and wherein the open end of the second power division output branch is parallel to the second output line at intervals.

8. The phase shifter with an adjustable output mode according to claim 1, wherein when two or more fixed circuits are provided on the fixed dielectric plate, an isolation line is provided between two adjacent second output lines.

9. The phase shifter with an adjustable output mode according to claim 1, wherein the power division input branch is provided with an input impedance conversion line, wherein the first power division output branch is provided with a first impedance conversion line, wherein the second power division output branch is provided with a second impedance conversion line, and wherein widths and lengths of the power division input branch, the first power division output branch, the second power division output branch, the input impedance conversion line, the first impedance conversion line, the second impedance conversion line, and the second output line are adjustable.

10. The phase shifter with an adjustable output mode according to claim 1, wherein shapes, widths and lengths of the single-port coupling line, the first output coupling line, the second output coupling line and the power division input coupling line are adjustable.

11. The phase shifter with an adjustable output mode according to claim 1, wherein the fixed circuit is arranged on the fixed dielectric plate by a PCB etching process, and the sliding circuits are arranged on the moving sliding plate by the PCB etching process.

12. The phase shifter with an adjustable output mode according to claim 1, wherein a side of the moving sliding plate provided with the sliding circuits is covered with a PTFE film.

13. The phase shifter with an adjustable output mode according to claim 1, wherein when the input line is coupled with the first output line through the single-port coupling line, wherein the phase shifter is in a single-port output operating mode; wherein when the input line is coupled with the first output line and the second output line through the power division input coupling line, the first output coupling line and the second output coupling line simultaneously, the phase shifter is in a double-port output operating mode, the phase of the output signal of the first output line remains unchanged, and the phase of the output signal of the second output line changes with the movement of the moving sliding plate.

14. An antenna comprising the phase shifter with an adjustable output mode according to claim 13, wherein when the phase shifter is in a single-port output operating mode, the antenna is in a wide beam operating mode in a vertical plane, and wherein when the phase shifter is in a double-port output operating mode, the antenna is in a narrow beam operating mode in a vertical plane, the phase of the output signal of the second output line changes with the movement of the moving sliding plate, and the direction of the antenna is capable of being adjusted with the movement of the moving sliding plate.

* * * * *